US012658829B2

(12) United States Patent
Hinz et al.

(10) Patent No.: US 12,658,829 B2
(45) Date of Patent: Jun. 16, 2026

(54) MODULAR HEAVY-DUTY DRIVE TRAIN, ELECTRIC POWER UNIT FOR AN AIRCRAFT AND USE OF A MODULAR DRIVE TRAIN

(71) Applicant: RHEINISCH-WESTFÄLISCHE TECHNISCHE HOCHSCHULE (RWTH) AACHEN, Aachen (DE)

(72) Inventors: Arne Hinz, Thedinghausen (DE); Rik W. De Doncker, Leven (BE)

(73) Assignee: RHEINISCH-WESTFÄLISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 193 days.

(21) Appl. No.: 18/695,382

(22) PCT Filed: Sep. 21, 2022

(86) PCT No.: PCT/EP2022/076141
§ 371 (c)(1),
(2) Date: Mar. 26, 2024

(87) PCT Pub. No.: WO2023/052206
PCT Pub. Date: Apr. 6, 2023

(65) Prior Publication Data
US 2024/0396477 A1 Nov. 28, 2024

(30) Foreign Application Priority Data

Sep. 29, 2021 (DE) ..................... 10 2021 125 241.5

(51) Int. Cl.
*H02P 5/747* (2006.01)
*B60K 1/02* (2006.01)
(Continued)

(52) U.S. Cl.
CPC ............. *H02P 5/747* (2013.01); *B63H 21/17* (2013.01); *B63H 23/12* (2013.01); *B64D 35/021* (2024.01);
(Continued)

(58) Field of Classification Search
CPC ....... H02P 5/74; B64D 35/024; B64D 35/021; B64D 35/025; B63H 21/17; B63H 23/12; B60K 1/02; B60Y 2200/222
See application file for complete search history.

(56) References Cited

U.S. PATENT DOCUMENTS

| | | | |
|---|---|---|---|
| 2019/0118966 A1* | 4/2019 | Hardwick .......... | G05B 23/0235 |
| 2020/0070953 A1* | 3/2020 | Tzabari .................. | F16H 48/24 |
| 2021/0152105 A1* | 5/2021 | Froelich .................. | B60L 58/21 |

FOREIGN PATENT DOCUMENTS

| | | | |
|---|---|---|---|
| DE | 102012216781 A1 * | 9/2012 | |
| DE | 10-2015-226836 A1 | 7/2017 | |
| EP | 3213952 A1 | 9/2017 | |

OTHER PUBLICATIONS

Translation of DE102012216781A1 has been attached.*
(Continued)

*Primary Examiner* — Zoheb S Imtiaz
(74) *Attorney, Agent, or Firm* — Christensen, Fonder, Dardi, Busse; Andrew H. Auderieth; Peter S. Dardi

(57) ABSTRACT

Modular heavy-duty drive train comprising a plurality of drive modules and an output element, wherein each drive module comprises at least two electric drive units for driving a first summing gear and one load transmission device, wherein the at least two electric drive units drive the load transmission device of the respective drive module via the first summing gear, and wherein the load transmission devices are each coupled to the output element for parallel (Continued)

transmission of the drive power from the plurality of drive modules to the output element.

20 Claims, 4 Drawing Sheets

(51) Int. Cl.
  *B63H 21/17* (2006.01)
  *B63H 23/12* (2006.01)
  *B64D 35/021* (2024.01)
  *B64D 35/024* (2025.01)
  *B64D 35/025* (2025.01)
(52) U.S. Cl.
  CPC ......... *B64D 35/024* (2024.01); *B64D 35/025* (2024.01); *B60K 1/02* (2013.01); *B60Y 2200/222* (2013.01)

(56) References Cited

OTHER PUBLICATIONS

Barenhorst et al., "New Drive Train Concept with Multiple High Speed Generator", Journal of Physics: Conference Series GB, vol. 753, p. 1-10 (112001), (Sep. 1, 2016).
Liebherr, "Components for Tunnelling Machines", [found on site] www.components.liebherr.com, p. 1-12, [found on website 2023].
International Search Report for corresponding Patent Application No. PCT/EP2022/076141 dated Jan. 17, 2023.

* cited by examiner

MODULAR HEAVY-DUTY DRIVE TRAIN, ELECTRIC POWER UNIT FOR AN AIRCRAFT AND USE OF A MODULAR DRIVE TRAIN

CROSS REFERENCE TO RELATED APPLICATIONS

This application is a National Stage filing of PCT Application No. PCT/EP2022/076141 filed Sep. 21, 2022, entitled "Modular Heavy-Duty Drive Train, Electric Power Unit for an Aircraft and use of a Modular Drive Train", which claims priority to German Patent Application No. 10 2021 125 241.5 filed Sep. 29, 2021.

The electrification of mobile heavy-duty drives faces the problem of implementing a powerful yet lightweight electric drive train. This challenge primarily affects aviation applications, as electric drive topologies in this field must achieve a power density that is comparable to conventional jet engines. For example, a large aircraft according to the EASA CS-25 class requires a drive power of 2 megawatts (MW) to 70 MW per jet engine. Although the power of a single jet engine can be distributed across several electric motors using distributed propulsion concepts, individual motor outputs of several megawatts per electric motor may still be necessary. So-called "Propulsive Fuselage" aircraft concepts such as the STARC-ABL [9] and the aircraft type as per the Centreline project [6] illustrate this. Although the propulsion system in the rear of the aircraft is only intended to compensate for the aerodynamic losses caused by the friction of the aircraft fuselage, the required drive powers reach 2.6 MW in the case of the STARC-ABL and 4.5 MW for the tail drive of the Centreline concept [7].

The necessary lightweight and yet very powerful design of the electric machine leads to major implementation difficulties in the current prior art.

In the literature, attempts have been made to solve this problem using direct drives with high magnetomotive force and strong magnetic flux. This approach ultimately leads to partially or fully superconducting electric machines [5]. The use of superconductors requires the use of cryogenic cooling devices to achieve the extremely low operating temperatures of superconductors, which are typically below 70 Kelvin (K). Cryogenic coolers are inefficient and quickly gain weight as the amount of heat to be dissipated increases. As a result, the superconducting motor must be extremely efficient so that the weight savings in the electric machine are not overcompensated by the increased cooling system weight. This is countered by the alternating current losses that occur when superconductors are used in alternating fields. Due to the challenges described above, it has not yet been possible to demonstrate the necessary efficiency, as there is a lack of low-loss superconductors for AC applications. In addition, superconducting materials are very sensitive to mechanical influences, which makes their application in the mechanically demanding, highly stressed field of electric machines more difficult [4]. Therefore, the predicted power density for superconducting electric motors of up to 50 kW/kg remains to be proven [1].

Another approach used in the prior art to increase the power density of electric machines is to increase the mechanical speed. For a constant mechanical power, the required torque decreases with increasing speed. This reduces the electromotive force and the magnetic flux, so that smaller electric machines can be engineered. However, the power of the electric machine is limited in this case by the mechanical effects of the rotor dynamics. For safe operation, the electric machine must be operated below a critical speed of the rotor, which is determined by the mechanical properties of the rotor. As the mechanical resonance depends on the strength of the shaft and the weight of the rotor, these conditions lead to a reduction in machine length with increasing speed. In order to still be able to provide the required power, the diameter of the electric machine increases, which in turn increases the load on the rotor due to centrifugal forces. The mechanical limitation of the diameter and the length of the electric machine results in a material-related power limitation in the high-speed range. The prior art therefore pursues the approach of integrating direct drives into the aircraft structure in order to achieve weight savings by realising synergy effects [7, 11]. However, this approach leads to large rotor diameters, which represent a mechanical challenge even at the comparatively low propeller speeds. Accordingly, these drives have so far only been available as a concept. Instead, a high-speed variant of the direct drive was presented in the context of the STARC-ABL tail drive [10]. However, the publication does not contain any measurement results, only an illustration of the prototype and details of the drive concept. However, a patent has been applied for which utilises the results from [10, 11] and describes additional details on the control and design of the drive [3].

There are similar challenges in the field of wind turbines. With the current prior art, the increasing power of the generators leads to very heavy nacelles, which can limit the performance of the wind turbine. To circumvent this limitation, drive trains have been proposed that distribute the power to several smaller high-speed generators via gearing systems. This approach leads to lighter drive trains and also increases the reliability of the wind turbine through better maintainability and redundancy [2]. However, when applied to aircraft drives, this approach would only be suitable for smaller drive powers in the lower single-digit megawatt range, as the diameter of the drive train increases with the increasing number of smaller high-speed drives to such an extent that it cannot be used for aerodynamic reasons. If the number of high-speed drives driving the gearing system is limited, the individual high-speed machines become heavier with increasing power, making the drive unsuitable for aircraft propulsion due to its high weight.

Another challenge in the implementation of electric or hybrid-electric aircraft propulsion systems is the design of the electrical supply system for operating the electric motors. The prior art provides for an on-board power supply system with high voltage, which is fed by batteries, fuel cells or shaft generators [6, 8, 9]. The sources are distributed within the aircraft so that considerable cable runs are required to supply the drives. This entails various disadvantages in the prior art. Firstly, the power cabling adds to the weight of the electric propulsion system, which means that the other components of the aircraft have to be even lighter. In addition, there are insulation problems, as the insulation capacity of air decreases with falling air pressure. As a result, production errors such as air pockets, which are tolerable for land systems, can lead to malfunctions at cruising altitude. This in turn means that the production methods must be further developed and specially adapted to aviation requirements. Furthermore, the sensitivity of power electronics to cosmic radiation increases with increasing voltage. Together with the much higher radiation exposure at cruising altitude, this leads to greater stress on the power electronic components and to higher failure rates. A fault in a branched supply network must in turn be detected and isolated in order to maintain the operation of the rest of the drive train. This makes mains protection devices necessary, which require circuit breakers, the weight of which increases rapidly with the magnitude of the short-circuit currents and mains voltages.

A system is known from the prior art which provides a series connection of voltage sources that supplies a series connection of electric drives. The topology works according to the principle of a modular multilevel converter (MMC). The disadvantage of the system is that a considerable communication effort is required to maintain the operation of the drive [8]. As a result, the susceptibility of the propulsion system to faults increases, as disruptions in communication due to influences such as cosmic radiation can lead to failures, which increases the effort required to design the communication equipment. Furthermore, propulsion systems based on high-performance on-board electrical systems are not suitable for retrofitting, meaning that aircraft already in service can only be retrofitted at great expense.

Based on the aforementioned prior art and the associated disadvantages, the object of the present invention is to provide an electric heavy-duty drive train which can be integrated into the existing on-board electrical systems of existing aircraft and of which the installation space and weight do not exceed those of conventional drive trains, but at the same time can provide the performance of conventional drive trains.

The presented invention offers a modular approach that enables small, lightweight high-speed drives to be used to provide a heavy-duty drive train for the propulsion of large aircraft. The use of autonomous drive modules with limited power makes it possible to integrate the voltage source and drive train into a compact drive module which can be operated with low voltages of up to approximately 1 kV. The electrically isolated operation of the drive modules also minimises the necessary communication, which reduces susceptibility to faults. With a suitable choice of power per drive module, it is also possible to use the same drive modules to produce modular electric drive trains to drive power units for the entire CS-25 class. This reduces the certification effort and production can be rationalised to a greater extent. Furthermore, the modular heavy-duty drive train according to the invention can be used to realise electric power units that can use the same on-board electrical systems and communication interfaces as conventional jet engines. This makes it possible to upgrade aircraft that have already been delivered for a longer service life by replacing the conventional power units.

LITERATURE

[1] Balachandran, T.; Lee, D.; Salk, N.; Haran, K. S.: A fully superconducting air-core machine for aircraft propulsion. IOP Conference Series: Materials Science and Engineering, vol. 756, pp. 12030, 2020.

[2] Barenhorst, F.; Serowy, S.; Andrei, C.; Schelenz, R.; Jacobs, G.; Hameyer, K.: New Drive Train Concept with Multiple High Speed Generator. Journal of Physics: Conference Series, vol. 753, pp. 112001, 2016.

[3] Haran, K. S.: High Frequency Electric Motor, Control System, and Method of Manufacture. Patent specification, U.S. Pat. No. 10,965,235 B2.

[4] Haran, K. S.; Kalsi, S.; Arndt, T.; Karmaker, H.; Badcock, R.; Buckley, B.; Haugan, T.; Izumi, M.; Loder, D.; Bray, J. W.; Masson, P.; Stautner, E. W.: High power density superconducting rotating machines-development status and technology roadmap. Superconductor Science and Technology, vol. 30, no. 12, pp. 123002, 2017.

[5] Luongo, C. A.; Masson, P. J.; Nam, T.; Mavris, D.; Kim, H. D.; Brown, G. V.; Waters, M.; Hall, D.: Next Generation More-Electric Aircraft: A Potential Application for HTS Superconductors. IEEE Transactions on Applied Superconductivity, vol. 19, No. 3, pp. 1055-1068, 2009.

[6] Seitz, A.: CENTRELINE Project Preview. 7th EASN International Conference, 2017.

[7] Siemens AG: CENTRELINE-Concept validatioN sTudy foR fusElage wake-fillIng propulsion integration, D 4.04 Electric Machinery Preliminary Design Report, 2018.

[8] Wangemann, J.; Schult, J.: Electrical Drive System for an Aircraft and Operation Method. Patent specification, U.S. Pat. No. 10,035,607 B2, 2018.

[9] Welstead, J.; Felder, J. L.; Guynn, M.; Haller, B.; Tong, M.; Jones, S.; Ordaz, I.; Quinlan, J.; Mason, B.: Overview of the NASA STARC-ABL (Rev. B) Advanced Concept, 2017.

[10] Yoon, A.; Xiao, J.; Lohan, D.; Arastu, F.; Haran, K.: High-Frequency Electric Machines for Boundary Layer Ingestion Fan Propulsor. IEEE Transactions on Energy Conversion, vol. 34, no. 4, pp. 2189-2197, 2019.

[11] Yoon, A. K.; Lohan, D.; Arastu, F.; Xiao, J.; Haran, K.: Direct Drive Electric Motor for STARC-ABL Tail-Cone Propulsor. In: AIAA Propulsion and Energy 2019 Forum, AIAA Propulsion and Energy 2019 Forum, 08192019.

According to a first aspect, the present invention relates to a modular heavy-duty drive train. The modular heavy-duty drive train comprises a plurality of drive modules and an output element, wherein each drive module comprises at least two electric drive units for driving a first summing gear and one load transmission device, wherein the at least two electric drive units drive the load transmission device of the respective drive module via the first summing gear, and wherein each of the plurality of load transmission devices is coupled to the output element for parallel transmission of the drive power from the plurality of drive modules to the output element.

The modular drive train according to the invention enables the use of comparatively small electric machines/ drive units for the propulsion of large aircraft. According to the invention, the design of the electric machine is less restricted by mechanical problems, so that shorter machine lengths and diameters are sufficient compared to the design of a single large electric machine. This enables the use of ultra-high speed machines (>40,000 rpm) with high power density. In addition, the electric drive module can operate at low voltages as only a fraction of the total drive power needs to be provided by each of the drive modules.

The heavy-duty drive train according to the invention makes it possible to achieve a high drive power at an output element with relatively small, high-speed electric drive units. With the number of, for example, eight 250 KW electric drive modules, the heavy-duty drive train according to the invention can provide a resulting drive power of 2 MW at the output element. In addition to the powerful and lightweight design of the drive train according to the invention, the modular drive concept offers a high degree of redundancy. As a result, the reliability requirements for the individual electric drive module are reduced compared to solutions having only one electric machine, which enables the design with a higher power density In addition, the modularity of the electric drive train according to the invention offers economic advantages. Suitable power segmentation at the level of the electric drive modules makes it possible to manufacture electric power units for the entire CS-25 class. The certification or approval effort required to achieve an EASA CS-25, such as the approval parts constituted by CS 25.1310, CS 25.1351, CS 25.1357 certification, can be reduced due to the modularisation. The production of electric drive modules can therefore achieve high quantities, which facilitates automation and mass production. The latter also leads to products of better design with standardised interfaces.

The load transmission devices can comprise at least one shaft or can be formed by a shaft; in a preferred embodiment, the load transmission device can comprise or be formed by a hollow shaft.

The plurality of load transmission devices are each coupled to the common output element of the heavy-duty drive train; for example, the coupling between the respective load transmission devices and the output element can be a mechanical coupling. The respective load transmission devices are coupled to the output element in such a way that the drive power can be transmitted from the respective load transmission device to the output element. The load transmission devices are each coupled here to the output element in such a way that they can transmit the respective drive power of the respective load transmission devices to the output element in parallel with each other.

In the simplest possible embodiment, it can be provided to connect the load transmission devices directly to the output element mechanically in each case, wherein the connection can, for example, be frictionally engaging or form-fitting, in particular a predetermined breaking point can be provided with the connection between the load transmission device and the output element and releases the respective load transmission device from the output element in the event of excessive twisting or the occurrence of excessive torsional bending relative to the output element.

Alternatively, a friction clutch can be provided between the respective load transmission device and the output element, for example, wherein the provided friction clutch separates the load-transmitting connection to the output element when the load transmission device is blocked or when the load transmission device comes to a standstill, this process being reversible. Furthermore, any clutches known from the prior art can be provided.

A second summing gear can be arranged between the load transmission devices and the output element for load transmission from the load transmission devices to the output element.

Furthermore, according to the invention, a coupling device can be provided between at least one of the first summing gears and the respective load transmission device and/or between at least one of the transmission devices and the output element.

The coupling device can be realised as a friction clutch, for example. Alternatively, a centrifugal clutch can also be provided, wherein the centrifugal clutch can disengage automatically in the event of a gearing system blocking or similar. The centrifugal clutch design also has the advantage that, by means of the centrifugal clutch, a mechanical speed synchronisation can be realised, which can compensate for possible synchronisation errors or differences in the speeds of the multiple drive modules or directly physically intercept them.

According to the invention, a classically disengageable clutch, as is known from classical mechanical engineering, can also be used. The synchronisation could be either electrical or mechanical. In turn, the differences in the speeds or torques of the load transmission devices can be compensated via the respective synchronisation in such a way that a synchronised speed and torque is transmitted to the output element.

It can be provided that the first and/or second summing gear is configured as a planetary gearing, particularly preferably as a single-stage planetary gearing.

In the embodiment of the summing gear as planetary gearing, the electric drive units drive the planetary gears or planets of the respective planetary gearing. Depending on the application, the planetary gears can preferably be provided with the following transmission ratios between the respective load transmission device and the output element:

Fixed-Wing Drive:
    Output element speed, wherein a propeller or fan of a power unit is arranged directly on the output element: 1,000-5,000 rpm, Transmission device speed: 85,000 to 120,000 rpm, resulting transmission ratio in the range of 17-120

Rotorcraft Drive:
    Output element speed corresponds to main rotor speed: 200-400 rpm
    Transmission element speed: 85,000-120,000 rpm,
    resulting transmission ratio in the range of 212-600

Ship Propulsion:
    Output element speed corresponds to screw speed: 100-2,000 rpm
    Transmission device speed: 10,000-50,000 rpm
    resulting transmission ratio in the range of 5-500

Heavy Land Vehicles:
    Output element speed corresponds to wheel speed: 100-200 rpm
    Transmission device speed 10,000-50,000 rpm
    resulting transmission ratio in the range of 50-500

In particular, the load transmission devices can be configured as hollow shafts, wherein the plurality of load transmission devices of the plurality of drive modules are mounted so that they can rotate inside each other and relative to one another. The arrangement provided enables independent rotation of the respective load transmission devices of the respective drive modules relative to one another and accordingly independently of each other, thus allowing parallelised load transmission from the respective drive elements to the common output element.

According to the invention, it can be provided that at least one of the plurality of electric drive units comprises at least one direct current source, at least one switching element, at least one inverter or, as an alternative to the inverter(s), at least one suitable direct current controller and at least one electric motor, wherein the at least one switching element is arranged at the at least one direct current source in order to switch at least one direct current source on or off, the at least one inverter or suitable direct current controller being arranged between the at least one direct current source and the at least one motor.

The switching element can be a circuit breaker, disconnector or fuse, for example. The direct current source is arranged at the input of the inverter or alternatively at the input of the suitable direct current controller. The at least one output of the inverter or, alternatively, of the suitable DC converter serves as an output for the at least one motor. The switching element can be a DC contactor, such as the Schaltbau C310K/500 or Schaltbau CT1130/11 models. According to the invention, however, a fuse, such as a SIBA SQB-DC 2, can also be used as the switching element.

The inverter in this case controls the speed and the torque of the electric drive. Control algorithms that control the flux and torque independently of each other are preferred for rotary field machines, which means that field-orientated control is possible. If suitable direct current controllers are used, these can be used to control switched reluctance machines, wherein torque observers are preferably used to control the corresponding motors.

The electric drive unit can also include at least one communication interface for controlling the electric motor and the direct current source.

The at least one electric drive unit can additionally comprise at least one DC/DC converter, wherein the at least one DC/DC converter is arranged between the at least one direct current source and the at least one inverter or alternatively the at least one suitable direct current controller. The DC/DC converter can be of multiphase design here, with or without galvanic isolation. According to the invention, an SiC MOSFET-based DC/DC converter can be used. In particular, the DC/DC converter has the task of dynamically adapting the voltage of the power source (fuel cells and/or batteries) so that the inverter of the machine can operate either at maximum peak power (during take-off and landing) or at maximum efficiency (when cruising).

The intended design of the electric drive unit enables a high degree of integration of the associated power electronics, which serves to reduce the weight of the drive train. As fuel cell and battery voltages generally operate at low voltage levels and are optimised to remain sufficiently lightweight and compact, the electric drive unit and the drive module can be standardised and easily integrated. This avoids the need for a complex on-board electrical system to adapt voltage and power for the electric drive train, reducing the complexity and weight of the drive train. Consequently, a fully integrated drive module offers the possibility of realising electric drive systems with high performance and low weight without the need for superconducting components.

The inverter can, for example, be configured as a power electronic inverter, which can preferably be configured as a multiphase inverter.

In particular, the suitable direct current controller can be configured with n phases, wherein each phase is configured as an asymmetrical bridge and the electric drive is configured as a switched reluctance machine, with $n>0$, $n \in \mathbb{N}$.

The direct current source can comprise at least one battery storage system or a fuel cell. In a preferred embodiment, at least one polymer electrolyte membrane fuel cell (PEMFC) can be used according to the invention. For example, at least one fuel cell stack, such as an EKPO NM12 single stack, can be used according to the invention. According to the invention, at least one hydrogen fuel cell can be used, wherein the oxygen required for operation can be provided from the ambient air by means of at least one turbocharger.

The at least one electric drive unit can be configured as a high-speed motor, in particular selected from the group of a switched reluctance machine (SRM) or a rotating field machine, preferably a permanent magnet synchronous machine (PMSM). The electric high-speed motors, such as the SRM or PMSM in particular, can be operated with a voltage of around 1 kV.

According to a further aspect, the present invention relates to an electric power unit for an aircraft comprising at least one electric drive train according to the first aspect of the present invention, wherein the rotors of the power unit are driven via the output element of the electric drive train.

The rotors of the power unit are the propulsion-generating elements of the power unit, such as the rotor or the power unit blades or the propeller blades of the aircraft.

According to a further aspect, the invention relates to the use of a modular drive train according to the first aspect of the invention for driving the power unit blades or a rotor of an aircraft. Further applications relate to the application or use of the drive train according to the first aspect of the invention for driving a tunnel boring machine, a ship propulsion system, a self-propelled harvesting machine or for driving heavy land-based vehicles.

In the following, with reference to the appended figures, exemplary embodiments of the heavy-duty drive train according to the invention and its individual components are described.

Figure 1:
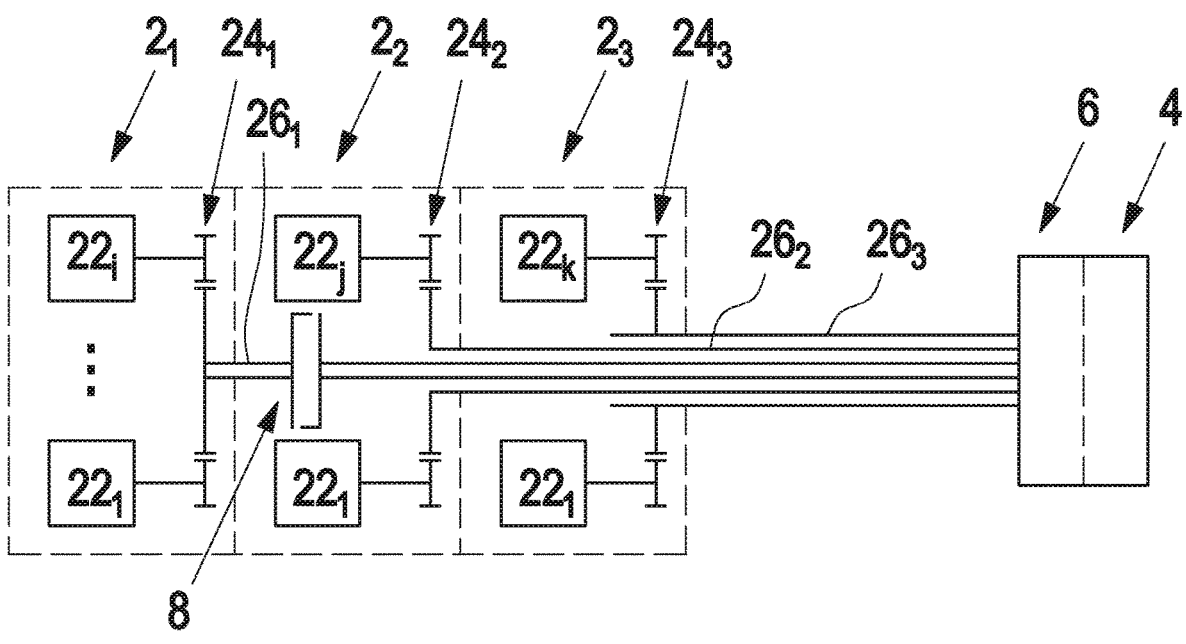
FIG. 1 shows a schematic representation of an exemplary embodiment of a modular heavy-duty drive train according to the invention.

FIG. 1 shows a schematic representation of an exemplary embodiment of a modular heavy-duty drive train according to the invention. In the embodiment shown, the drive train comprises three drive modules 2 and one output element 4. For better identification, the three drive modules 2 ($2_1$, $2_2$ and $2_3$) and their components are provided with an index. Each drive module 2 has at least two electric drive units 22 for driving a first summing gear 24 and a load transmission device 26.

In the exemplary embodiment shown, the at least two electric drive units 22 are shown as two boxes with the indices 1 and i, j or k, with i, j, k>1, $n \in \mathbb{N}$ to represent any number greater than or equal to two electric drive units 22 of a drive module 2. The load transmission devices $26_1$, $26_2$ and $26_3$ of the respective drive modules $2_1$, $2_2$ and $2_3$ are each coupled to the output element 4 for parallel transmission of the drive power (speed and torque) from the plurality of drive modules 2 to the output element 4.

As can be seen from FIG. 1, each of the three exemplary drive modules $2_1$, $2_2$ and $2_3$ drives a load transmission device $26_1$, $26_2$ and $26_3$, which is configured as a hollow shaft in the embodiment shown. The three transmission devices $26_1$, $26_2$ and $26_3$ shown are connected here in parallel to the output element 4 for load transmission. A second summing gear 6 can be arranged between the output element 4 and the load transmission devices 26, wherein the load transmission device is then transferred from the load transmission devices $26_1$, $26_2$ and $26_3$ to the output element 4 via the summing gear 6.

At least one of the first summing gears $24_1$, $24_2$ and $24_3$ and/or second summing gear 6 can preferably be configured as a planetary gearing.

According to a particularly preferred aspect of the present invention, the planetary gearings can be configured in particular as single-stage planetary gearings. In this case, the electric drive units 22 of a drive module 2 can drive the planets or planetary gears of the first summing gear 24 of the respective drive module 2. The output of the respective first summing gear 24 is connected to the respective load transmission device 26 of the respective drive module 2 for transmitting the drive power. It can also be seen from FIG. 1 that, according to the invention, the load transmission devices 26 can be at least partially in shaft form and particularly preferably in the form of a hollow shaft, or the load transmission devices 26 can comprise at least one corresponding hollow shaft for the load transmission. The provision of the hollow shafts as load transmission devices 26 has the advantage here that the hollow shafts can be rotatably mounted inside one another and relative to one another in order to enable a compact design of the drive train.

Figure 2:
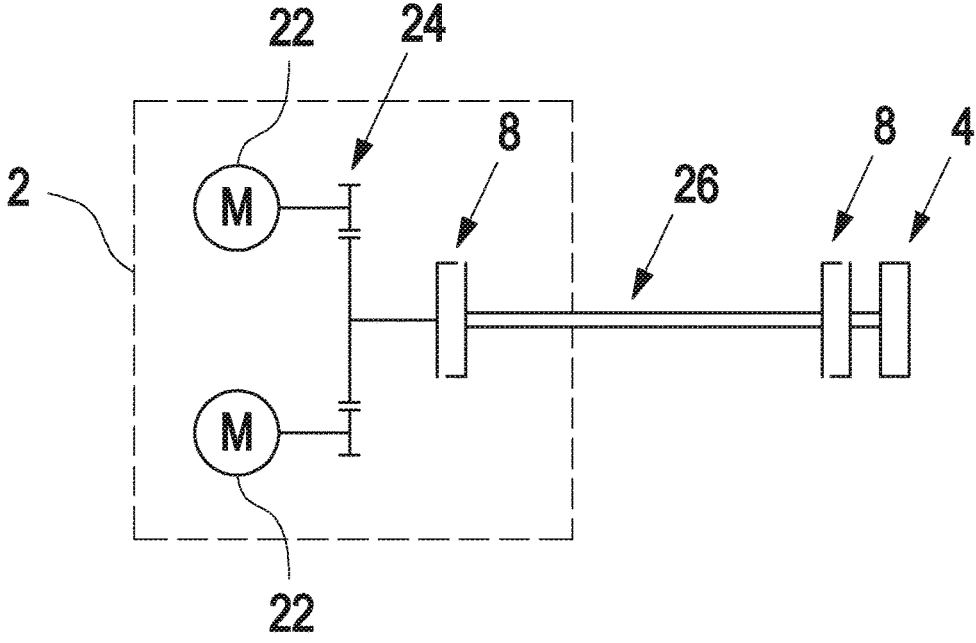
FIG. 2 shows a schematic representation of an exemplary embodiment of a drive module for a heavy-duty drive train according to the invention.

A schematic representation of an exemplary embodiment of a drive module 2 is shown in FIG. 2. In the illustrated embodiment, the drive module 2 comprises two drive units 22. The two drive units 22 drive a first summing gear 24, which transmits the drive power to the load transmission device 26. An optional coupling device 8 is shown between the first summing gear 24 and the load transmission device 26, by means of which the load transmission of the first summing gear 24 to the transmission element 26 can be configured to be switchable. The load transmission device 26 is in turn coupled to the output element 4 via a further optional coupling device 8 for selective load transmission. The configuration of the two coupling devices 8 makes it possible to separate the load transmission device 26 from both the output element 4 and the first summing gear 24.

Figure 3:
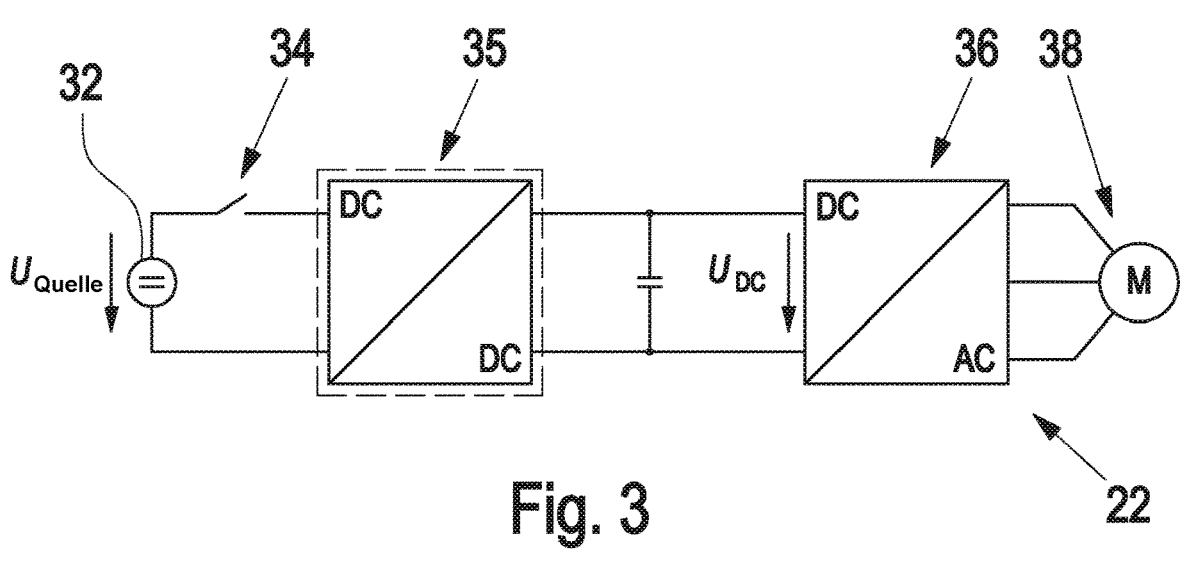
FIG. 3 shows a schematic representation of an exemplary embodiment of an electric drive unit.

FIG. 3 shows a schematic view of an exemplary embodiment of an electric drive unit 22. The electric drive unit 22 has at least one direct current source 32, at least one switching element 34, at least one inverter 36 (shown by way of example in FIG. 3) or alternatively at least one direct current controller 36 and at least one electric motor 38. In addition, a communication interface (not shown) can be configured for controlling the electric motor 38 and the direct current source 32. In particular, the communication interface according to the invention may be a bidirectional communication interface. The at least one switching element 34 is arranged on the at least one direct current source 32 in order to switch the at least one direct current source 32 on or off, wherein the switching can be realised, for example, by disconnecting at least one pole of the direct current source from the other elements of the electric drive unit 22. The at least one inverter 36 or alternatively the direct current controller 36 is arranged between the at least one direct current source 32 and the motor 38. As also indicated by the dashed box in FIG. 3, at least one DC/DC converter 35 can optionally be arranged between the electric direct current source 32 and the suitable direct current controller or inverter 36 in accordance with the invention. The DC/DC converter 35 can, for example, be configured to be multi-phase with or without galvanic isolation.

Figure 4A:
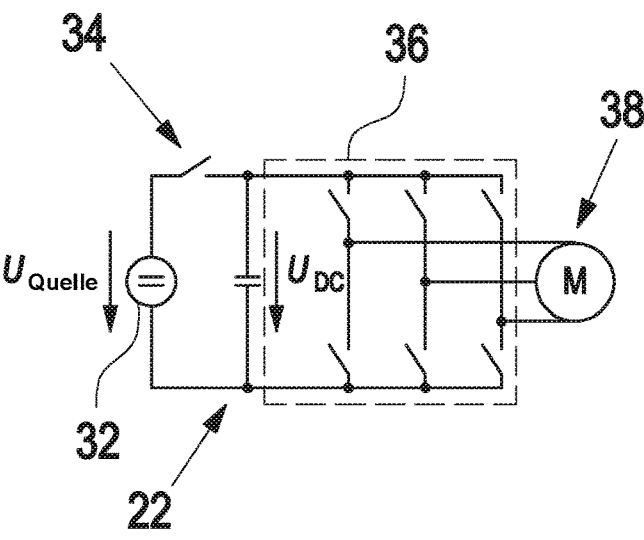
FIG. 4A shows a schematic representation of a first exemplary embodiment of an electric drive unit.
Figure 4B:
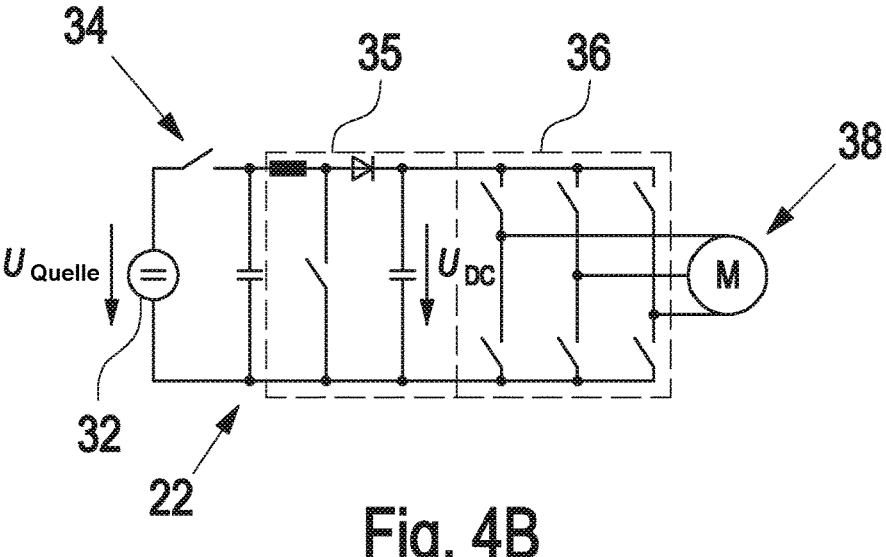
FIG. 4B shows a schematic representation of a second exemplary embodiment of an electric drive unit.

FIGS. 4A and 4B show two different embodiments of a circuit of an electric drive unit 22, wherein in FIG. 4A the motor 38 is controlled via a B6C circuit/fully controlled three-phase bridge or six-pulse bridge circuit. In the embodiment shown in FIG. 4B, a DC/DC converter 35 in the form of a boost converter is provided in addition to the embodiment shown in FIG. 4A.

Figure 5A:
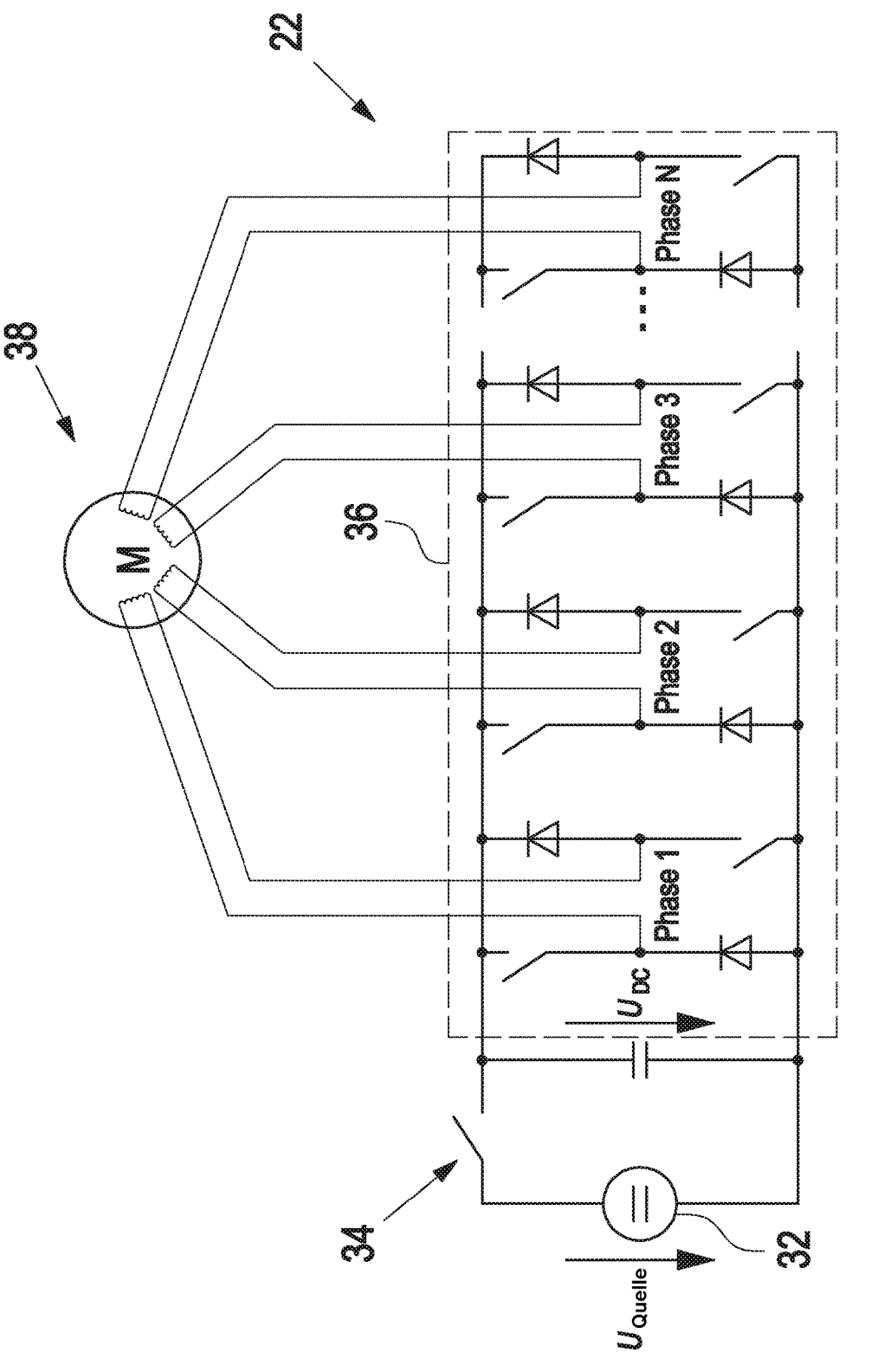
FIG. 5A shows a schematic representation of a third exemplary embodiment of an electric drive unit.
Figure 5B:
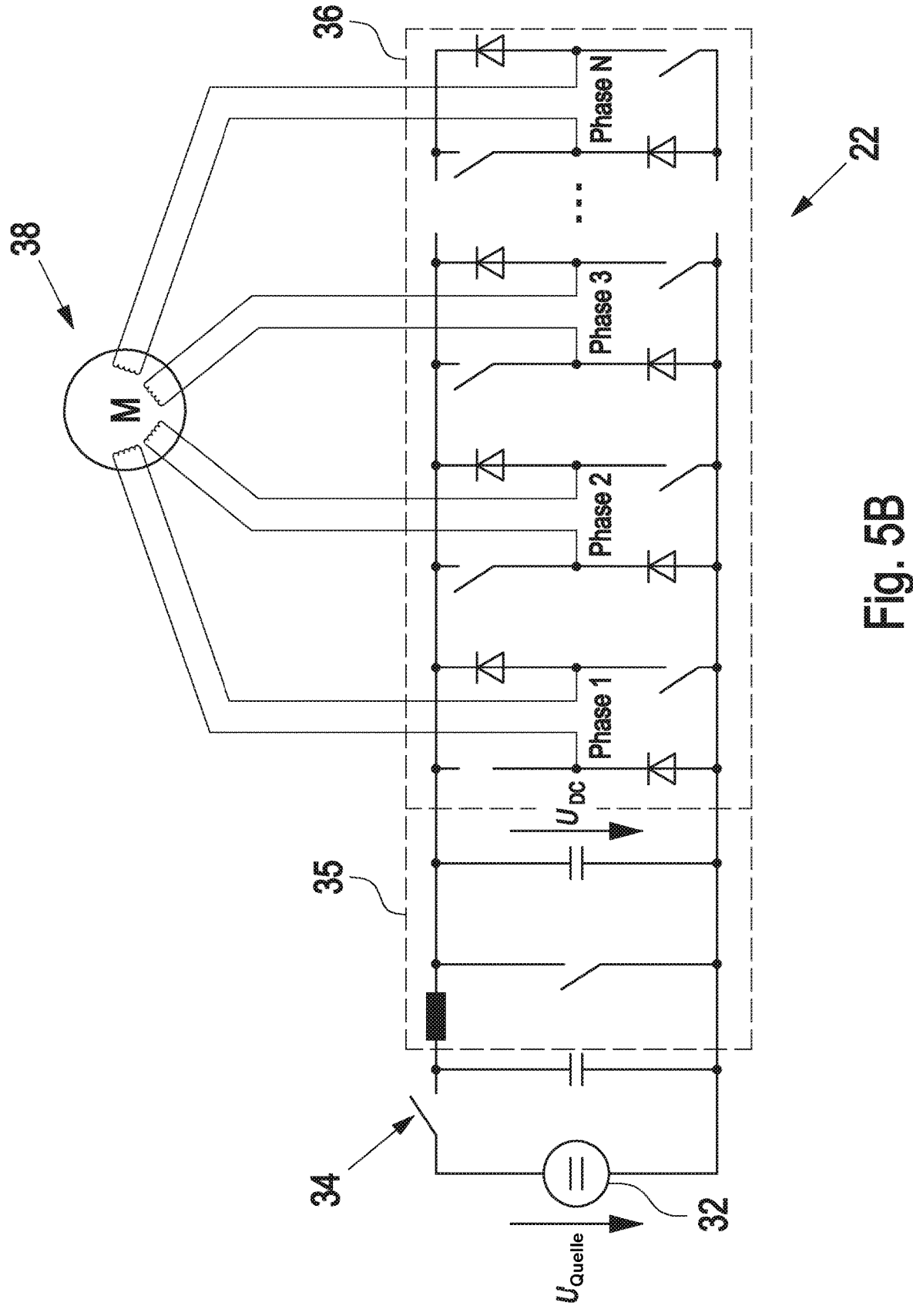
FIG. 5B shows a schematic representation of a fourth exemplary embodiment of an electric drive unit.

FIGS. 5A and 5B again show two exemplary embodiments, wherein the suitable DC converter 36 is realised in the form of an n-phase asymmetrical half-bridge, which controls the electric motor 38. Compared to FIG. 5A, the embodiment shown in FIG. 5B also has a DC/DC converter 35 in the form of a boost converter.

LIST OF REFERENCE SIGNS drive module 2
output element 4 second summing gear 6
coupling device 8
electric drive unit 22
first summing gear 24
load transmission device 26
direct current source 32
switching element 34
DC/DC converter 35
inverter/suitable DC/DC converter 36
electric motor 38

The invention claimed is:

1. A modular heavy-duty drive train comprising:
a plurality of drive modules; and
an output element;
wherein each drive module comprises at least two electric drive units for driving a first summing gear and a load transmission device specific for the drive module, wherein the load transmission device comprises a shaft,
wherein the at least two electric drive units drive the load transmission device of the respective drive module via the first summing gear, and
wherein the plurality of load transmission devices are each coupled to the output element for parallel transmission of the drive power from the plurality of drive modules to the output element.

2. The drive train according to claim 1, wherein a second summing gear for load transmission from the load transmission devices to the output element is arranged between the load transmission devices and the output element.

3. The drive train according to claim 1, wherein a coupling device is arranged between at least one of the first summing gears and the respective load transmission device and/or between at least one of the load transmission devices and the output element.

4. The drive train according to claim 2, wherein the first summing gear and/or the second summing gear are configured as planetary gearings, preferably as single-stage planetary gearings.

5. The drive train according to claim 1, wherein the load transmission devices are configured as hollow shafts, and wherein the hollow shafts are mounted rotatably relative to one another.

6. The drive train according to claim 1, wherein at least one of the electric drive units comprises at least one direct current source, at least one switching element, at least one inverter or at least one suitable direct current controller and at least one electric motor, wherein the at least one switching element is arranged at the at least one direct current source in order to switch at least one direct current source on or off, wherein the at least one inverter or suitable direct current controller is arranged between the at least one direct current source and the at least one motor for controlling the at least one motor.

7. The drive train according to claim 6, wherein the at least one electric drive unit additionally comprises at least one direct current converter, which is arranged between the at least one direct current source and the at least one inverter or the at least one suitable direct current controller.

8. The drive train according to claim 7, wherein the DC/DC converter is of multiphase design with or without galvanic isolation.

9. The drive train according to claim 6, wherein the inverter is configured as a power electronic inverter, which can preferably be of multiphase design.

10. The drive train according to claim 6, wherein the inverter is of n-phase design, wherein each phase is configured as an asymmetrical half-bridge and the electric drive is configured as a switched reluctance machine.

11. The drive train according to claim 6, wherein the direct current source comprises a battery storage system and/or a fuel cell.

12. The drive train according to claim 1, wherein at least one electric drive unit comprises a high-speed motor, in particular selected from the group of: a switched reluctance machine or a permanent magnet synchronous machine (PMSM).

13. An electric power unit for an aircraft, comprising at least one electric drive train according to claim 1, the drive train configured for driving a rotor of the electric power unit via the output element of the at least one electric drive train.

14. The drive train according to claim 1, wherein the output element is configured for driving power unit blades or a rotor of an aircraft.

15. The drive train according to claim 1, wherein the output element is configured for driving a tunnel boring machine, a ship propulsion system, a self-propelled harvesting machine or for driving heavy land-based vehicles.

16. The drive train according to claim 2, wherein a coupling device is arranged between at least one of the first summing gears and the respective load transmission device and/or between at least one of the load transmission devices and the output element.

17. The drive train according to claim 3, wherein the first summing gear and/or the second summing gear are configured as planetary gearings, preferably as single-stage planetary gearings.

18. The drive train according to claim 7, wherein the inverter is configured as a power electronic inverter, which can preferably be of multiphase design.

19. The drive train according to claim 7, wherein the inverter is of n-phase design, wherein each phase is configured as an asymmetrical half-bridge and the electric drive is configured as a switched reluctance machine.

20. The drive train according to claim 7, wherein the direct current source comprises a battery storage system and/or a fuel cell.

* * * * *